(12) United States Patent
Fei et al.

(10) Patent No.: US 11,201,530 B2
(45) Date of Patent: Dec. 14, 2021

(54) ACTUATING DEVICE AND METHOD OF MAKING THE SAME

(71) Applicant: Purdue Research Foundation, West Lafayette, IN (US)

(72) Inventors: Fan Fei, West Lafayette, IN (US); Xinyan Deng, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 611 days.

(21) Appl. No.: 15/992,002

(22) Filed: May 29, 2018

(65) Prior Publication Data

US 2018/0342938 A1    Nov. 29, 2018

Related U.S. Application Data

(60) Provisional application No. 62/511,678, filed on May 26, 2017.

(51) Int. Cl.
| | |
|---|---|
| *H02K 33/18* | (2006.01) |
| *H02K 7/065* | (2006.01) |
| *H02K 1/22* | (2006.01) |
| *B63G 8/08* | (2006.01) |
| *H02K 1/17* | (2006.01) |
| *H02K 33/06* | (2006.01) |
| *H02K 33/16* | (2006.01) |
| *B63H 1/36* | (2006.01) |
| *B63H 1/04* | (2006.01) |
| *B63G 8/00* | (2006.01) |

(52) U.S. Cl.
CPC .............. *H02K 33/18* (2013.01); *B63G 8/08* (2013.01); *B63H 1/36* (2013.01); *H02K 1/17* (2013.01); *H02K 1/22* (2013.01); *H02K 7/065* (2013.01); *H02K 33/06* (2013.01); *H02K 33/16* (2013.01); *B63G 2008/002* (2013.01); *B63H 1/04* (2013.01)

(58) Field of Classification Search
CPC ...... H02K 1/143; H02K 1/187; H02K 1/2786; H02K 21/18; H02K 21/22
See application file for complete search history.

(56) References Cited

U.S. PATENT DOCUMENTS

| | | | |
|---|---|---|---|
| 2014/0117788 A1* | 5/2014 | Takahashi | H02K 33/16 310/38 |
| 2018/0126147 A1* | 5/2018 | Hakim | A61B 5/4836 |
| 2018/0155020 A1* | 6/2018 | Le Moing | A63H 27/12 |

* cited by examiner

*Primary Examiner* — Quyen P Leung
*Assistant Examiner* — Minki Chang
(74) *Attorney, Agent, or Firm* — Purdue Research Foundation

(57) ABSTRACT

Disclosed herein are permanent magnetic AC machine direct-drive resonant flapper system for flapping wing micro air vehicles and flapping fin autonomous underwater vehicles.

10 Claims, 11 Drawing Sheets

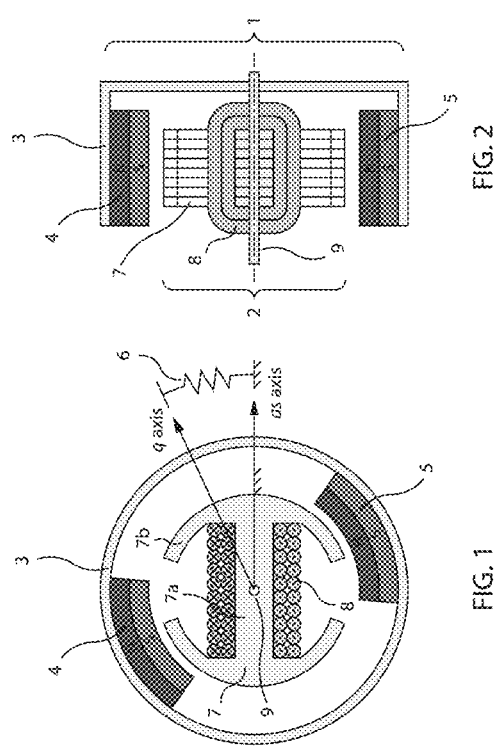

ACTUATING DEVICE AND METHOD OF MAKING THE SAME

STATEMENT OF GOVERNMENT INTEREST

A portion of this invention was developed under Grant 105758 between Purdue University and the Air Force Research Laboratory (AFRL). The U.S. Government may have certain rights in this invention.

TECHNICAL FIELD

The present application relates to the field of a permanent magnet based rotatably-reciprocating actuators, and in particular to a permanent magnet based actuator embedded in a direct-drive resonant flapper system.

BACKGROUND

This section introduces aspects that may help facilitate a better understanding of the disclosure. Accordingly, these statements are to be read in this light and are not to be understood as admissions about what is or is not prior art.

Conventional Flapping Wing Aerial Vehicles (FWAVs) to date generally utilize three types of actuation systems: piezoelectric cantilever mechanisms, motor driven linkages and motor gear direct drive. Piezoelectric actuation is proven to be effective at sub-gram flapping vehicles because of its high power density at high frequency. The piezoelectric actuator relies on high voltage and a precise transmission mechanism to operate. The actuation is from a laminated cantilever beam which generates a linear motion under high voltage. The linear motion is greatly amplified with an intricate transmission to drive the flapping wing. The high voltage requirement constraints its application in autonomous vehicle due to the lack of at scale power circuits. Motor driven linkages are used on larger scale, the motor is running continuously and usually at their optimal operating point, thus guarantees high efficiency. However, the fixed linkage constraints the output motion at a fixed kinematic, therefore additional actuation is needed to generate control forces/torques for flight.

Motor direct drive system generally uses two motor to drive the two wings directly. It utilizes an elastic component to conserve kinetic energy and a gear transmission to amplify the motor's reciprocating motion. Since the motor is not running continuously, the efficiency is not optimal. This type of actuation requires a precisely assembled gear transmission, which will cost additional varying efficiency loss. Notwithstanding the above, all systems described above requires precise fabrication and assembly, and suffers from various degrees of structural fatigue due to vibration. Some fail in the matter of minutes, while others take longer. There is a need for an elastic component that conserves the kinetic energy of the moving components, so that power is spent on only non-conservative energies such as friction, damping and aerodynamic/hydro dynamic damping from the flapping wing/fin.

SUMMARY OF THE INVENTION

The presented application relates to a flapping-wing resonant system with a high-efficiency rotary resonating actuator. The actuator is comprised of an elastic component and a permanent magnetic AC (alternating current) machine with two poles and a single phase. The stator has a single core and a single armature winding. The core is made up with laminated metal alloy material of high magnetic permeability. Both ends of the core have extending core shoes curving around in a circular shape to form a semi closed path for magnetic flux. A single conductor wire winds around the core covering the entire length of the core. The rotor rotates outside the stator, which contains two permanent magnets with aligned polarity. The magnets are attached to a magnetically permeable enclosure. In an embodiment, a rotating frame with cutouts are used to mount the magnets and reduce the rotor's moment of inertia, which may be used in aerial vehicles. The elastic member is mounted directly to the vehicle body. In some embodiments, a cylindrical drum is used to provide a closed path for magnetic flux, which may be used for underwater vehicles. The elastic member connects the rotor and stator. The actuator can be driven by alternating current generated by H-bridges. The frequency of the input signal is at the resonant frequency of the wing/fin actuator system. A novel and effective yaw torque generation is described in this disclosure, along with a coupled wing/hinge/actuator resonance system that generate optimal lift using a compliant passive rotating hinge on the wing.

BRIEF DESCRIPTION OF THE FIGURES

FIGS. 1 and 2 illustrate the structure of the permanent magnet AC actuator design in its top view and side section view respectively.

DETAILED DESCRIPTION

Figure 4:
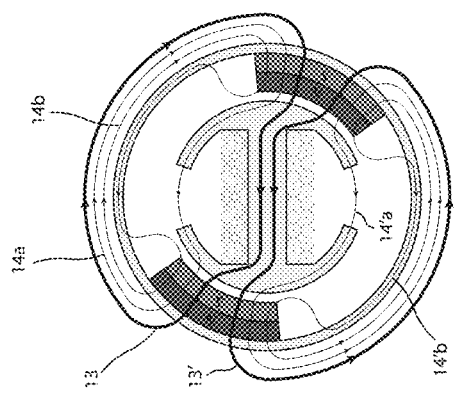
FIGS. 3 and 4 illustrate the magnetic flux path in the core from armature coil and permanent magnet respectively.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A permeant magnet AC actuator based direct drive resonant flapping wing/fin system is disclosed herein. The actuator is designed for sub-gram scale, decagram scale flapping wing micro aerial vehicle and hectogram scale underwater vehicle. Various embodiments are presented here for such systems.

The basic layout of the actuator design is illustrated in FIG. 1 and FIG. 2. These two figures only describe the main configuration of the actuator, and hence a geometric relation is not to be taken as the actual design. Embodiments of this design includes additional components that are omitted here. The actuator consists of a rotor 1 and a stator 2. The rotor 1 includes a housing/shield 3 and two magnets 4 and 5. The two magnets are attached inside of the housing with north/south polarity aligned, sit 180 degrees away from one and another. The housing preferably is made with magnetic permeable material, which acts as shielding for the magnetic field. An elastic element 6 connects the rotor and a fixed body, which could be the stator or the vehicle body. The stator consists a core 7 and an armature winding 8. The core should be made with laminated sheets of high permeability material to reduce eddy current. The core has a straight section 7a where the winding is spread across. At both ends of the core, two core shoes 7b extend out and runes back along a circular path. The core shoe extensions form a semi closed path for magnetic flux that helps reduce air gap reluctance. A shaft 9 runs through the center of the stator and rotor, allowing rotary motion of the rotor. The stator is affixed to the vehicle body and the wing/fin assembly is attached on the rotor. The open-circuit equilibrium position is at when as axis and q axis are aligned.

Figure 3:
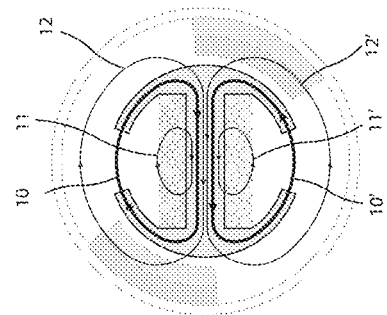

The inclusion of a permeable core for the winding in this invention increases the efficiency of the actuator by increasing the winding's self-inductance and flux linkage. The magnetic flux in the core is shown in FIG. 3 and FIG. 4, out of plane components are not shown here but were considered. The flux path illustration only depicts the general trend, and the geometric relations are not to be taken literally. When voltage is applied across the armature winding, the extended core shoes form semi-closed magnetic flux paths 10. The leakage flux 11 is small. The unbounded flux path 12 has a much larger reluctance, therefore most the flux follows 10. This in turn increases the self-inductance of the core. The core shoes leave an optional airgap to reduce the weight of the core. This is a design tradeoff that can be optimized based on different application requirements. The core also reduces the reluctance along the flux path between the two magnets. The core traps the flux within the winding along path 13 therefore greatly increases flux linkage, thus boosting the torque generation, leakage flux 14 that does not contribute to flux linkage are small since their large reluctance. A fully connected housing 3 shown here traps part of the leakage flux 14b which will marginally improve the flux linkage. However, in different embodiments, the housing can have an open design to accommodate wing assembly and reduce weight. When q axis is perpendicular to as axis, the magnetizing flux linkage is at its maximum.

The reciprocating motion of the actuator is driven by a periodic voltage signal. The driving frequency is selected at the system's resonant frequency. When voltage is applied across the armature winding, the core can be seen as an electromagnet, attracting the set of pair magnets so that their polarities tries to align. The current source pumps energy into the winding. At zero rotation angle, the field energy is at maximum, generating maximum torque. As the rotor turns, energy is stored in the spring component and drives the wing. The spring element stores mechanical energy (elastic potential energy and kinetic energy). When the voltage input switches its polarity, the rotor is driven to the other direction. The spring releases the stored energy, generates a restoring torque that drives the rotor toward its middle position. The spring element create resonance of the spring/wing system. The resonance driving system for oscillatory motion is proven to be efficient since the power is only spent on non-conservative energy such as the aerodynamic damping from the wing/fin, friction and heat.

This configuration of the actuator, along with a wing/fin system, can be parameterized and optimized for varies size and lift/thrust requirements. Three embodiments are described here.

Figure 5:
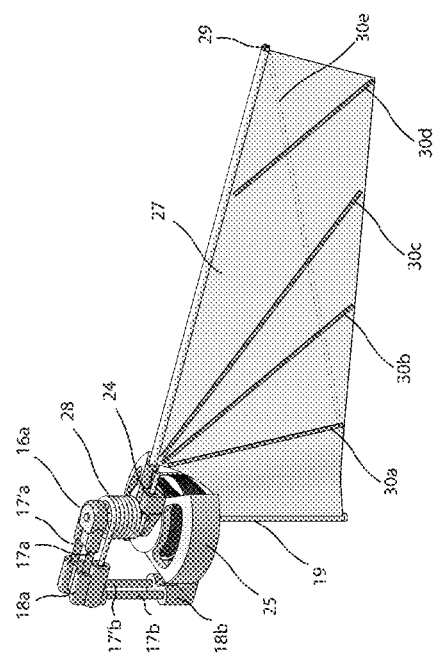
FIG. 5 illustrates a perspective view of the embodiment of the permanent magnet AC actuator band design in a decagram scale flapping wing/actuator system, wherein the actuator nests partially in the wing shoulder.
Figure 6:
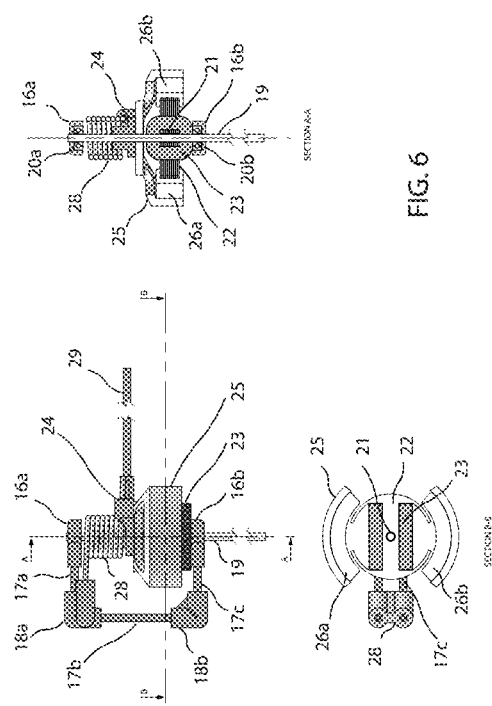
FIG. 6 illustrates the section views of the decagram scale actuator.
Figure 7:
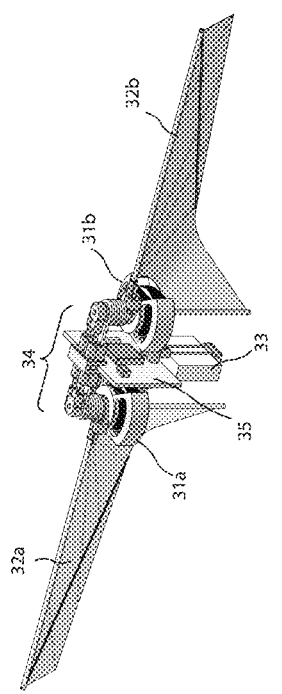
FIG. 7 illustrates a perspective view of a fully autonomous decagram flapping wing based vehicle design using the decagram scale actuator.
Figure 8:
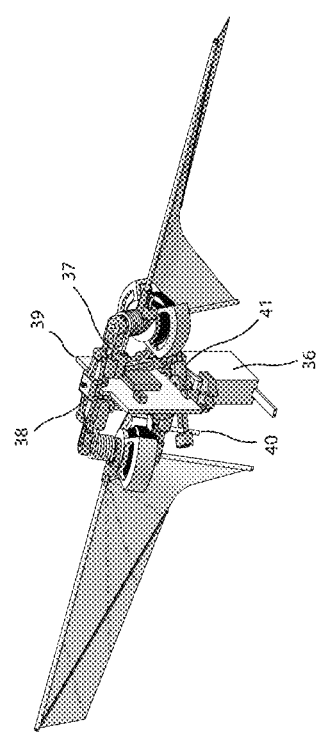
FIG. 8 illustrates a perspective view of another decagram scale flapping wing based vehicle design wherein a third actuator positions the axes of rotation of the two actuators at an angle, thereby generating yaw control torque.

The first embodiment of the actuator is shown in FIG. 5 and FIG. 6. This embodiment is optimized for a decagram scale flapping wing micro aerial vehicle. Specifically, the wing length is 70 mm long and flapping at 34 Hz. The single actuator/wing system in FIG. 5 weights 4.3 grams and generates a lift of 8.2 grams. The complete vehicle is shown in FIG. 7. The system has three main components, the actuator, wing and frame. The frame has two bearing housings 16, connected using lightweight carbon fiber rods 17 and two elbows 18a and 18b. A stainless-steel shaft 19 runs through the bearings 20 and a clearance-fit brass sleeve bearing 21 with in the stator core 22. The stator core and winding 23 are fixed to the lower bearing housing 16'. A wing adaptor 24 is mounted on the rotor housing 25 of the actuator. Two neodymium permanent magnets 26 are attached to the rotor housing. The rotor housing has an open design to accommodate the wing membrane 27, enables the actuator to sit compactly at wing shoulder. A torsion spring 28 sits around the shaft, fixed to the wing adaptor and the upper elbow 18a where its neutral position is as shown. A hollow carbon fiber rod 29 is used as the leading-edge that drives the wing. The wing has a bi-stable design; it rotates freely about the shaft and its leading-edge, creating a passive bi-stable camber which gives a desirable angle of attack when flapping during up and down stroke. Five carbon fiber veins 30 are used to enhance the rigidity of a portion of the wing area so the desired shape is formed when flapping. FIG. 7 shows the dual wing vehicle with two actuators 31, two wings 32 and a battery 33 attached to the frame 34. The frame utilizes the circuit board 35 as a structural element. The circuit board contains an MCU (microcontroller unit), driver circuits and an IMU (inertia measurement unit). The vehicle's total lift is 16.2 grams and weights 13.2 grams. An alternative configuration of this embodiment is shown in FIG. 8, wherein a servo type actuator 36 is added to change stroke plane orientation relative to the body. The two wing-actuator assemblies pivot about a shaft 37 along the bodies lateral direction, held together by a lock piece 38 onto the circuit board body 39. A linkage rod 40 extends from each wing-actuator assembly. The guide arm 41 driven by the servo will turn the two wing-actuator assemblies to pivot in different directions. The thrust component in the longitudinal/lateral plane of the two wing will generate a yaw torque.

Figure 9:
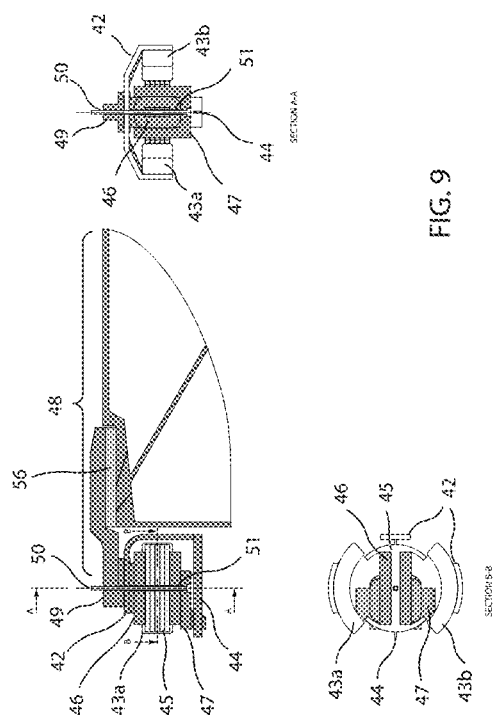
FIG. 9 illustrates the section views of a sub-gram scale flapping based wing/actuator system.
Figure 10:
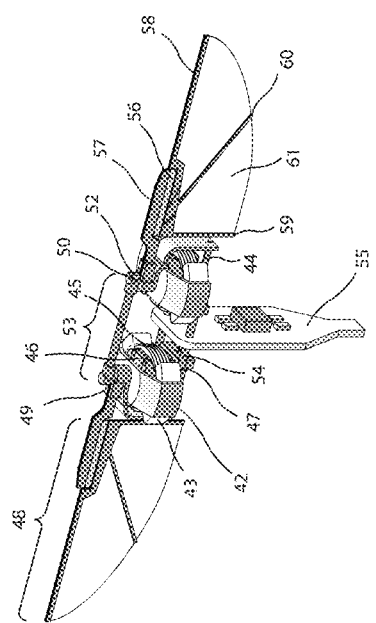
FIG. 10 illustrates a perspective view of a sub-gram scale flapping wing based vehicle design with a driver circuit board body.
Figure 11:
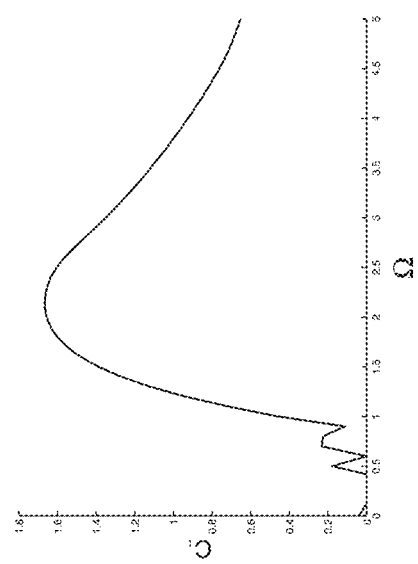
FIG. 11 illustrates a frequency response of a lift coefficient of a coupled wing/hinge/actuator system as a function of a resonant frequency multiple between a wing/hinge subsystem and a wing/actuator system.

The second embodiment of the actuator is shown in FIG. 9. This embodiment is optimized for a sub-gram scale flapping wing micro aerial vehicle. Specifically, the wing length is 15 mm long and flapping at 160 Hz. The single actuator/wing system weights 0.24 grams and generates a lift of 0.45 grams. The two-wing vehicle is shown in FIG. 10. The outer diameter of the actuator is 6.8 mm but the parts are design with manufacturability in mind. The rotor housing 42 is reduced to a punched metal plate, where the two magnets 43 are attached within. The elastic element in this embodiment is a cantilevered leaf spring 44 with its end fixed on the rotor housing. The core 45 and coil 46 is mounted on the stator housing 47. The wing 48 is connected to the rotor through the wing adaptor 49. A miniature drive shaft 50 is fixed on the rotor and runs through the sleeve bearing 51 in the stator and 52 in the retainer 53. Two actuator can be connected using carbon fiber rods 54. A PCB body 55 with a miniature H-bridge driver is mounted on the rods. The vehicle's total lift is 0.9 grams and weights 0.5 grams. The wing is a laminated assembly. It utilizes a compliant hinge 56 that allows the wing to rotate about its leading-edge passively and generates a restoring torque. The wing driving rod pieces 57 sandwiches a compliant polymer material that connects to the wing and forms the spring hinge. The stiffness is designed such that the resonant frequency of the wing hinge system is 2 times the resonant frequency of the wing actuator system. This guarantees the passive wing rotation trajectory generates maximum lift under the specific operation condition. The relationship between the multiple of the resonance and the averaged lift coefficient is shown in FIG. 11. The leading edge 58, trailing edge 59 and vein 60 are cut so that the fiber runs in their respective length direction. They bonded to the wing membrane 61 using thin sheets of polymer adhesive.

Figure 12:
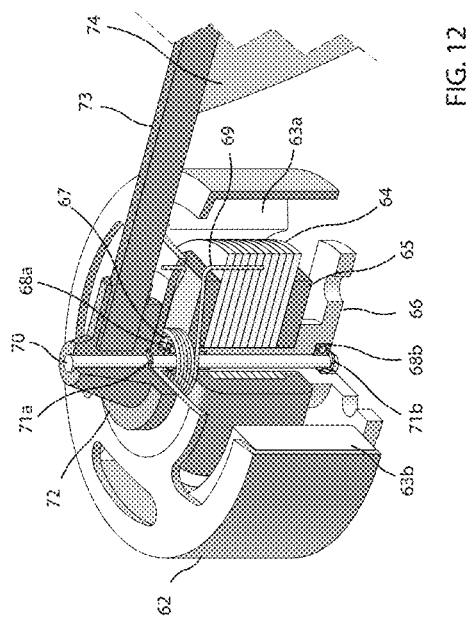
FIG. 12 illustrates a perspective view of an underwater flapping fin actuator.
Figure 13:
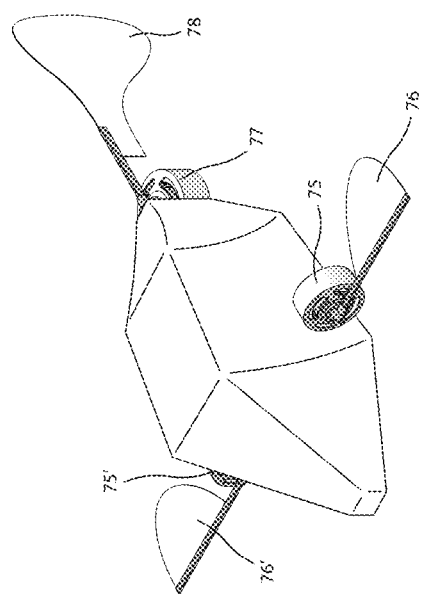
FIG. 13 illustrates a fish robot configuration using three flapping fin actuators of one or two different sizes and operating points.

The third embodiment is designed for underwater vehicles, shown in FIG. 12. The fin is 100 mm long and flapping at 7 Hz. The Actuator has a diameter of 44 mm, weights 85 grams and produces a propulsion of 5.9N. For underwater vehicle, there is no weight constraint. The geometry of the actuator is designed for maximum efficiency. The rotor housing 62 has a closed design. The magnets 63 are also thicker and almost connects with each other. The stator core 64 has almost fully connected core shoes only leaving a small airgap for winding coil 65. The stator is mounted on the base 66, which has a hollow tube throughout the stator. The top of the tube is threaded, a bearing housing 67 is screwed on to secure the stator and a ball bearing 68a sit in. Another ball bearing 68b is attached at the bottom of the base. A torsion spring 69 is directly attached to the core through a small hole around the bearing housing. The other end of the spring is connected to the rotor. The shaft 70 is held in position using two retainer clips 71 at both ends. The fin adapter 72 is attached to the shaft where the leading edge 73 and fin 74 are installed. A possible configuration of a fish robot is shown in FIG. 13. Two actuators 75 on the sides with two pectoral fins 76 and one 77 on the back with a tail fin 78. The actuators are designed to have different size and flapping frequency.

All three abovementioned embodiments share the same short and wide design, which maximizes the torque. The utilization of a steel core and core shoes greatly improves the utilization of the magnetic energy by boosting the flux and self-inductance over air coil design subsequently increases the efficiency. The actuation system described in this invention does not contain transmission mechanisms of any kind, minimizing efficiency loss and structure fatigue failure. Simple construction provides easy manufacturability and serviceability.

The invention claimed is:

1. An actuating device, comprising:
a first actuating device, a second actuating device, and a servo-type actuator,
wherein the first actuating device comprises:
a stator within a housing, wherein the stator comprises a core portion and a shoe portion, wherein the shoe portion comprises an arc, wherein the shoe portion extends from each terminus of a plurality of termini of the core portion;
a coil extending around the core portion of the stator;
a plurality of magnets coupled within the housing, wherein each magnet of the plurality of magnets are coupled with the stator, wherein the each magnet of the plurality of magnets are coupled on opposite sides of the housing, and wherein the housing is configured to rotate about an axis through the stator, wherein the axis is parallel to a longitudinal extensions of the shoe portion of the stator; and a spring coupled to the housing and the stator, wherein the spring is configured to revert the housing back to an original state after being actuated by magnetic induction;
a wing connected to the housing by a rod that extends away from the housing,
wherein the second actuating device comprises:
a second housing; and
a second wing connected to the second housing through a second rod that extends away from the second housing,
wherein the servo type actuator is configured to pivot each of the wing and the second wing in different directions.

2. The actuating device of claim 1, further comprising a shaft
connecting the housing, the stator, and the coil.

3. The actuating device of claim 1, wherein the each magnet of the plurality of magnets have polarities that are aligned.

4. The actuating device of claim 1, wherein each magnet of the plurality of magnets are on a point of the housing which is farthest away from a center point of the core portion, and wherein an angle formed between the each magnet of the plurality of magnets through the center point of the core portion is 180 degrees.

5. An actuating device, comprising:
a first actuating device, a second actuating device, and a servo type actuator, wherein the first actuating device comprises:
a stator within a housing, wherein the stator comprises a core portion and a shoe portion, wherein the shoe portion comprises an arc, wherein the shoe portion extends from each terminus of a plurality of termini of the core portion;
a coil extending around the core portion of the stator;
a plurality of magnets coupled within the housing, wherein each magnet of the plurality of magnets are coupled with the stator, wherein the each magnet of the plurality of magnets are coupled on opposite sides of the housing, and wherein the housing is configured to rotate about a shaft through the core portion of the stator, wherein the shaft is through the housing and the coil; and
a torsion spring around the shaft, wherein a first end of the torsion spring is coupled to the housing and a second end of the torsion spring is coupled to a first elbow, wherein the first elbow is coupled to the stator; and
a wing connected to the housing through a rod that extends away from the housing,
wherein the second actuating device comprises:
a second housing; and
a second wing connected to the second housing through a second rod that extends away from the second housing,
wherein the servo type actuator is configured to pivot each of the wing and the second wing in different directions.

6. The actuating device of claim 5, wherein each magnet of the plurality of magnets are on a point of the housing which is farthest away from a center point of the core portion, and wherein an angle formed between the each magnet of the plurality of magnets through the center point of the core portion is 180 degrees.

7. The actuating device of claim 5, wherein the each magnet of the plurality of magnets have polarities that are aligned.

8. An actuating device, comprising:
a first actuating device, a second actuating device, and a servo type actuator wherein the first actuating device comprises:
   a stator within a housing, wherein the stator comprises a core portion and a shoe portion, wherein the shoe portion comprises an arc, wherein the shoe portion extends from each terminus of a plurality of termini of the core portion;
   a coil extending around the core portion of the stator;
   a plurality of magnets coupled within the housing, wherein each magnet of the plurality of magnets are coupled with the stator, wherein the each magnet of the plurality of magnets are coupled on opposite sides of the housing wherein the housing is configured to rotate about a shaft through the core portion of the stator, wherein the shaft is through the housing and the coil;
   a wing connected to the housing through a rod that extends away from the housing; and
   a cantilever leaf spring, wherein a first end of the cantilever leaf spring is fixed to the housing and a second end of the cantilever leaf spring rests in a notch of a support, wherein the support is coupled to the stator,
wherein the second actuating device comprises:
   a second housing; and
   a second wing connected to the second housing through a second rod that extends away from the second housing,
   wherein the servo type actuator is configured to pivot each of the wing and the second wing in different directions.

9. The actuating device of claim 8, wherein each magnet of the plurality of magnets are on a point of the housing which is farthest away from a center point of the core portion, and wherein an angle formed between the each magnet of the plurality of magnets through the center point of the core portion is 180 degrees.

10. The actuating device of claim 8, wherein the each magnet of the plurality of magnets have polarities that are aligned.

\* \* \* \* \*